United States Patent
Chitrapura et al.

(10) Patent No.: US 7,487,174 B2
(45) Date of Patent: Feb. 3, 2009

(54) METHOD FOR STORING TEXT ANNOTATIONS WITH ASSOCIATED TYPE INFORMATION IN A STRUCTURED DATA STORE

(75) Inventors: Krishna Prasad Chitrapura, New Delhi (IN); Rahul Gupta, New Delhi (IN); Rajasekar Krishnamurthy, Sunnyvale, CA (US); Sriram Raghavan, San Jose, CA (US); Shivakumar Vaithyanathan, San Jose, CA (US); Huaiyu Zhu, Union City, CA (US); Jennifer L Beckmann, Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 11/334,255

(22) Filed: Jan. 17, 2006

(65) Prior Publication Data
US 2007/0168380 A1    Jul. 19, 2007

(51) Int. Cl.
*G06F 17/30*    (2006.01)
(52) U.S. Cl. .................... 707/102; 707/3; 707/4; 707/100; 707/101
(58) Field of Classification Search .............. None
See application file for complete search history.

(56) References Cited
U.S. PATENT DOCUMENTS

| | | | |
|---|---|---|---|
| 5,295,256 A | 3/1994 | Bapat | |
| 5,627,979 A | 5/1997 | Chang et al. | |
| 5,809,507 A | 9/1998 | Cavanaugh, III | |
| 5,970,490 A | 10/1999 | Morgenstern | |
| 6,549,922 B1 | 4/2003 | Srivastava et al. | |
| 7,340,459 B2 * | 3/2008 | Krohn et al. | 707/5 |
| 2003/0101194 A1 | 5/2003 | Rys et al. | |
| 2003/0204511 A1 | 10/2003 | Brundage et al. | |
| 2003/0229608 A1 | 12/2003 | Reynar et al. | |
| 2004/0006740 A1 | 1/2004 | Krohn et al. | |
| 2004/0162833 A1 * | 8/2004 | Jones et al. | 707/100 |
| 2005/0091249 A1 | 4/2005 | Hanson et al. | |
| 2005/0097504 A1 * | 5/2005 | Ballinger et al. | 717/100 |
| 2006/0053365 A1 * | 3/2006 | Hollander et al. | 715/512 |

* cited by examiner

*Primary Examiner*—Khanh B. Pham
*Assistant Examiner*—Andalib F Lodhi
(74) *Attorney, Agent, or Firm*—Shimokaji & Associates, P.C.; Samuel A. Kassatly

(57) ABSTRACT

A text annotation structured storage method stores text annotations with associated type information in a structured data store. The present system persists or stores annotations in a structured data store in an indexable and queryable format. Exemplary structured data stores comprise XML databases and relational databases. The method exploits type information in a type system to develop corresponding schemas in a structured data model. The method comprises techniques for mapping annotations to an XML data model and a relational data model. The method captures various features of the type system, such as complex types and inheritance, in the schema for the persistent store. In particular, the repository provides support for path navigation over the hierarchical type system starting at any type.

4 Claims, 20 Drawing Sheets

US 7,487,174 B2

METHOD FOR STORING TEXT ANNOTATIONS WITH ASSOCIATED TYPE INFORMATION IN A STRUCTURED DATA STORE

FIELD OF THE INVENTION

The present invention generally relates to query systems and in particular, the present system relates to querying documents that are associated with semantic annotations. More specifically, the present system pertains to storing the annotations in a structured data format such that queries can be simply expressed, efficiently executed, and return consistent results against a dynamic type system.

BACKGROUND OF THE INVENTION

Conventional information retrieval systems (also known as text retrieval systems or text search engines) view document collections as stand alone text corpora with little or no structured information associated with them. However, there are two primary reasons why such a view is no longer tenable. First, modern enterprise applications for customer relationship management, collaboration, technical support, etc., regularly create, manipulate, and process data that contains a mix of structured and unstructured information. In such applications, there is inherently a fair amount of structured information associated with every document. Second, advances in natural language processing techniques have led to the increased availability of powerful and accurate text analysis engines. These text analysis engines are capable of extracting structured semantic information from text. Such semantic information, usually extracted in the form of semantic annotations, has the potential to significantly improve the quality of free text search and retrieval.

Furthermore, while traditional enterprise applications such as human resources, payroll, etc., operate primarily off structured (relationally mapped) data, there is a growing class of enterprise applications in the areas of customer relationship management, marketing, collaboration, and e-mail that can benefit enormously from information present in unstructured (text) data. Consequently, the need for enterprise-class infrastructure to support integrated queries over structured and unstructured data has never been greater.

Text analytics is concerned with the identification and extraction of structured information from text. Text analytic programs such as annotators represent the extracted information in the form of objects called annotations. To use text analytics for integrating structured and unstructured information, annotations are persisted in a queryable and indexable form. In conventional systems, annotations are typically not persisted. Conventional systems that persist annotations use a format that is proprietary, ad-hoc, and often unusable across different application settings. Moreover, the design of storage and indexing techniques is often outside the domain of expertise of the authors of the analysis engine.

Additional conventional approaches comprise techniques for storing object graphs in a variety of structured databases: object-oriented, relational and, more recently, XML. While these techniques allow persistence of annotations, they do not support efficient retrieval of annotations primarily because of the characteristics of annotations and the dynamism associated with them. Instances produced by annotators may share objects. Consequently, queries written over the annotations comprise operations involving object identity. Further, objects produced by annotators may start at any level in a type system. Consequently, the task of running sophisticated queries over the output of annotators and associated structured data is difficult.

What is therefore needed is a system, a computer program product, and an associated method for a system and method for storing text annotations with associated type information in a structured data store. The need for such a solution has heretofore remained unsatisfied.

SUMMARY OF THE INVENTION

In one aspect of the present invention, A method of storing annotations with associated type information in a structured data store, comprising of generating an object type system; the object type system comprising at least two name objects and at least one action object, generating the annotations and associated object graphs, indicating relationships between annotations; each of the relationships responsive to an action, an initiator of the action and a recipient of the action, mapping an input object type system into a queryable structured data format, mapping input data from input objects in the input object type system to the queryable structured data format, retaining an identifier for each input object as a sub-element or an attribute of an element of the queryable structured data format; wherein the queryable structured data format and associated data persist in a structured data repository; wherein identity of the input objects is preserved in the structured data repository; and wherein the queryable structured data format comprises an XML schema; wherein the mapping the input object type system comprises the steps of selecting a type from the input object type system, determining if the type is a base type; and if the type is a base type, then creating an XML schema with name of the type; and if the type is not a base type, then creating an XML schema with name of the type, the XML schema a subtype of another XML schema.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Type: A type is any formal representation of an entity or relationship concept using the modeling concepts of some standard data model. For instance, using the relational data model, a type can be viewed as a relation whereas using an object oriented data model, a type can be viewed as a "class". The exact representation for a type is specific to a particular embodiment of this invention.

Attribute: Every type is associated with a set of one or more attributes that define the values associated with objects of that type. For instance, a person type can be associated with attributes First name and Last name so that every object of that person type has First name and Last name values.

XML: eXtensible Markup Language. A standard format used to describe semi-structured documents and data. During a document authoring stage, XML "tags" are embedded within the informational content of the document. When the XML document is subsequently transmitted between computer systems, the tags are used to parse and interpret the document by the receiving system.

Figure 1:
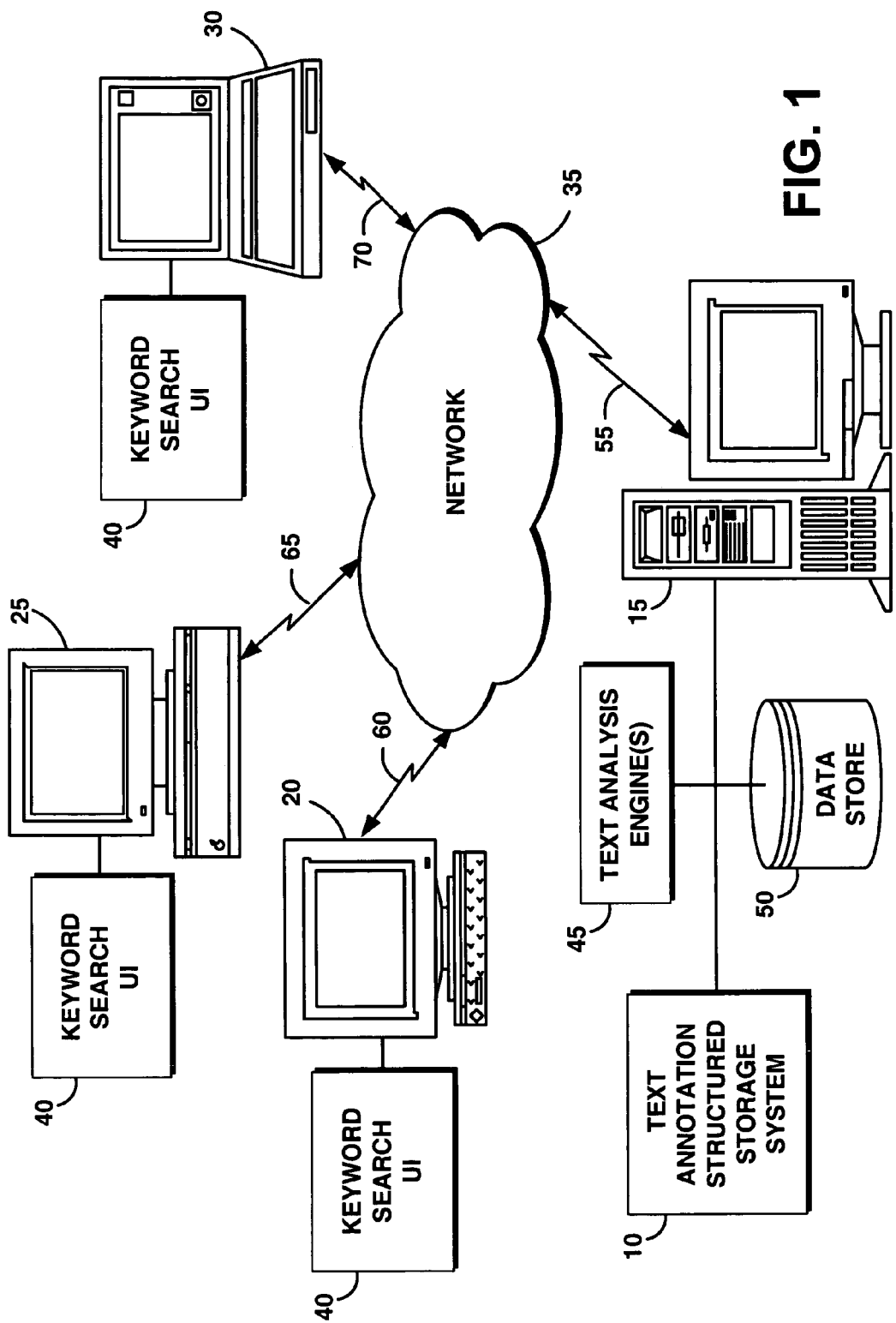
FIG. 1 is a schematic illustration of an exemplary operating environment in which a text annotation structured storage system of the present invention can be used.

FIG. 1 portrays an exemplary overall environment in which a system, a computer program product, and associated method (the "text annotation structured storage system 10" or the "system 10") for storing text annotations with associated type information in a structured data store according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

Users, such as remote Internet users, are represented by a variety of computers such as computers 20, 25, 30, and can access the host server 15 through a network 35 by means of, for example, a keyword search user interface (UI) 40. By utilizing a keyword search application such as the keyword search UI 40, a user can search data stored by system 10 in a structured data store.

One or more text analysis engines 45 analyze text such as, for example, documents, web pages, e-mails, etc. to extract data in the form of annotations; annotations generated by the text analysis engines are stored on a data store 50. Text analyzed by the text analysis engines 45 may be stored on the data store 50 or be accessible via network 35. System 10 persists extracted annotations in a structured data store enabling faster, more efficient queries on data stored by system 10.

Computers 20, 25, 30 each comprise software that allows the user to interface securely with the host server 15. The host server 15 is connected to network 35 via a communications link 55 such as a telephone, cable, or satellite link. Computers 20, 25, 30, can be connected to network 35 via communications links 60, 65, 70, respectively. While system 10 is described in terms of network 35, computers 20, 25, 30 may also access system 10 locally rather than remotely. Computers 20, 25, 30 may access system 10 either manually, or automatically through the use of an application such as the keyword search UI 40. While system 10 is described in terms of the keyword search UI 40, it should be clear that computers 20, 25, 30 can access a keyword search interface implemented on the host server 15 via network 35.

Figure 2:
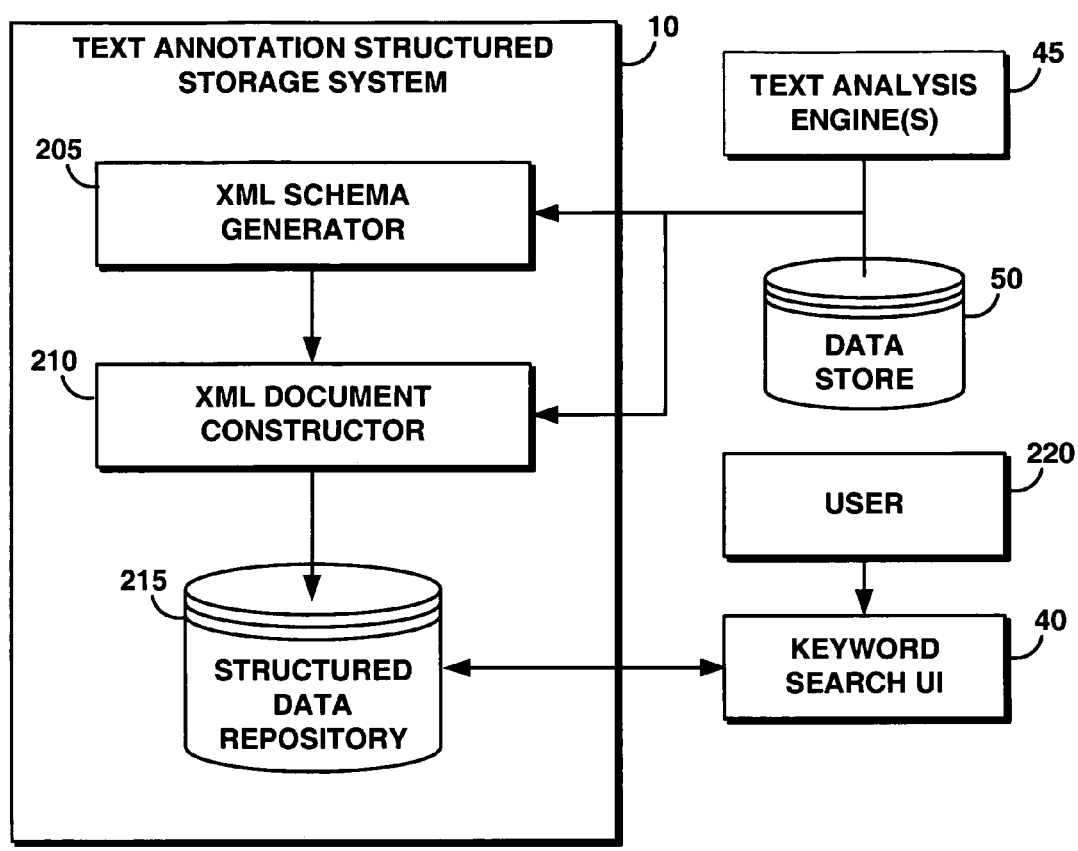
FIG. 2 is a block diagram of the high-level architecture of the text annotation structured storage system of FIG. 1 for generating XML schemas and XML documents from a type system and an object graph.

FIG. 2 illustrates a high-level hierarchy of system 10 for storing text annotations with associated type information as one or more XML schemas with associated XML documents comprising the text annotations. While system 10 is described for illustration purpose only in terms of XML, it should be clear that the invention is applicable as well to, for example, any structured or semi-structured language.

System 10 comprises an XML schema generator 205, an XML document constructor 210, and a structured data repository 215. Annotations generated by of the text analysis engines 45 and associated object graphs are stored in the data store 50. The XML schema generator 205 maps an input object type system into one or more XML schemas. The XML document constructor 210 maps an object graph into one or more XML documents based on the generated XML schema. The structured data repository 215 stores the output XML schemas and XML documents in the structured data repository 215. A user 220 queries the XML documents in the structured data repository 215 via the keyword search user interface 40.

Figure 3:
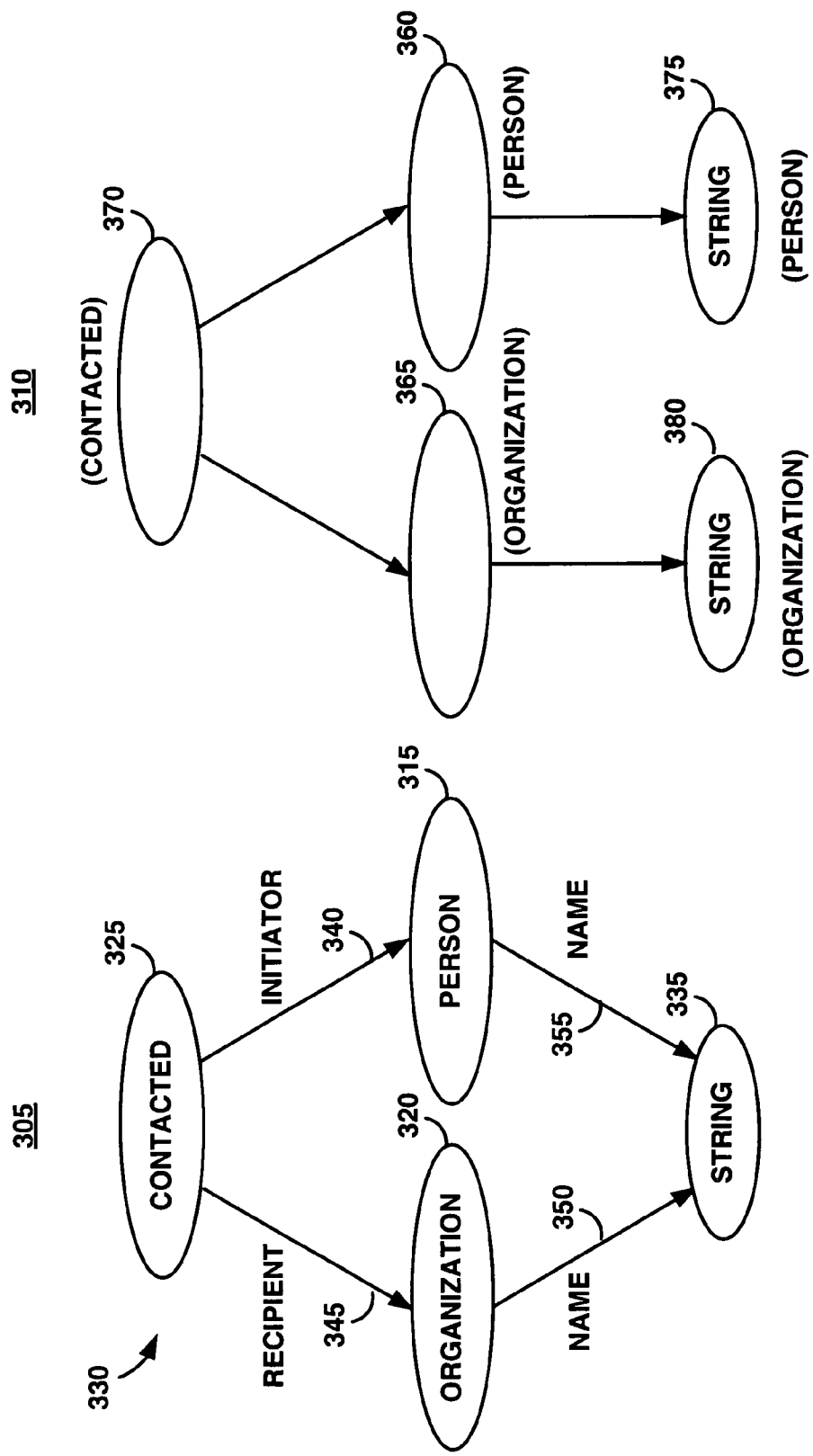
FIG. 3 is comprised of FIGS. 3A and 3B and represents a diagram of an exemplary type system and an exemplary object graph that can be stored in a structured format by the text annotation structured storage system of FIGS. 1 and 2.

FIG. 3 (FIGS. 3A, 3B) illustrates a diagram of an exemplary type system 305 and a simple XML representation 310 of the exemplary type system 305. Type system 305 is generated by the text analysis engines 45 comprising a named-entity person text analysis engine, a named-entity organization text analysis engine, and a relationship contacted text analysis engine. The named-entity person text analysis engine identifies person names in a text and produces objects of type person, denoted as a person 315. The named-entity organization text analysis engine identifies organization names in a text and produces objects of type organization, denoted as an organization 320. The relationship contacted text analysis engine identifies instances in which a person contacted an organization and produces objects of type contacted, denoted as contacted 325. Person 315, organization 320, and contacted 325 are collectively referenced as annotation types 330. Organization 320 and person 315 each have a string attribute, denoted as a string 335.

Edges between the annotation types 330 and string 335 indicate a relationship between each of the annotation types 330 and string 335. An edge 340 (further referenced as an initiator 340) between contacted 325 and person 315 indicates that person 315 is an "initiator" of the contact. An edge 345 (further referenced as a recipient 345) between contacted 325 and organization 320 indicates that organization 320 is a "recipient" of the contact. An edge 350 (further referenced as a name 350) and an edge 355 (further referenced as a name 355) indicate that the string attribute of organization 320 and person 315, respectively, is a name.

The simple XML representation 310 comprises XML schema types, one for each of the annotation types 330: a person schema type 360, an organization schema type 365, and a contacted schema type 370. System 10 captures information about initiator 340 by creating an XML sub-element for the person 315, shown as person string 375. System 10 captures information about recipient 345 by creating an XML sub-element for organization 320, shown as organization string 380.

Instances produced by the text analysis engines 45 may share objects. As a result, when user 220 writes queries over text annotations, the queries comprise operations involving object identity. Consequently, system 10 preserves the original object identity in the persistent store. Further, system 10 ensures that queries involving predicates on object-identity are not difficult to express.

Figure 4:
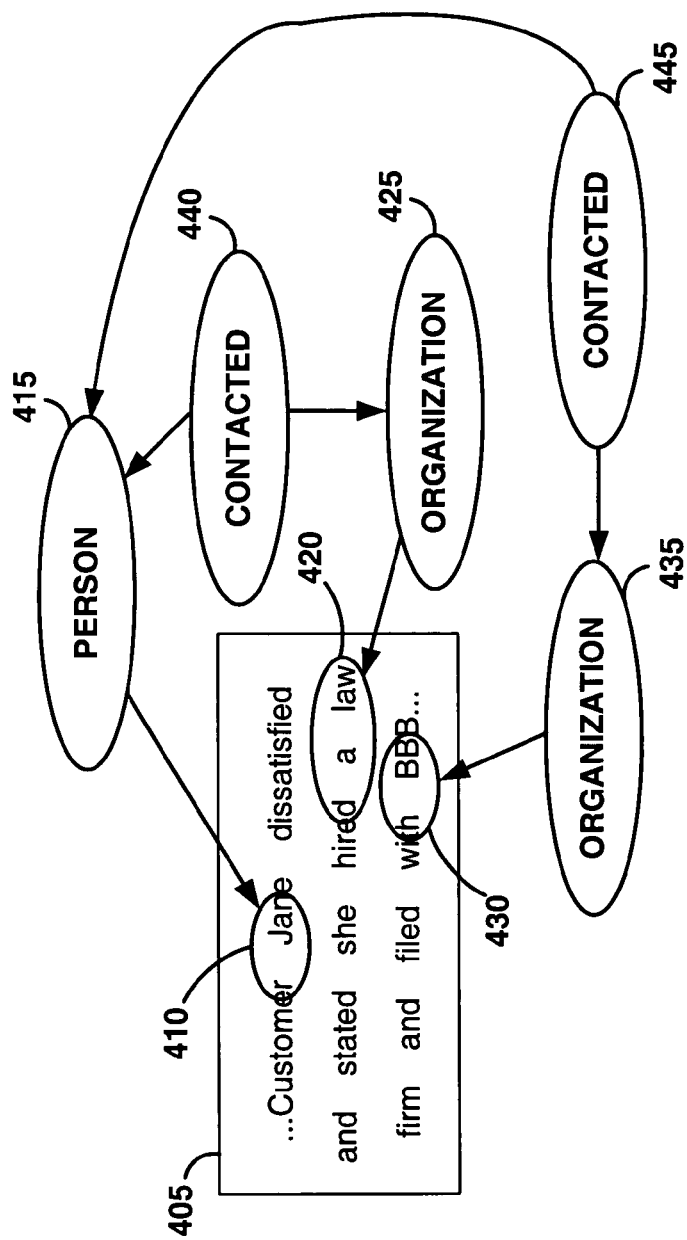
FIG. 4 is a diagram of exemplary annotations identified by a text analysis engine from a text.

FIG. 4 illustrates exemplary annotations generated by the text analysis engines 45 executed over an exemplary text 405. The named-entity person text analysis engine identifies a person 315, a "Jane" 410, designated as a person 415. The named-entity organization text analysis engine identifies two occurrences of organization 320, a "law firm" 420 designated as an organization 425 and a "BBB" 430 designated as an organization 435. The relationship contacted text analysis engine identifies two instances in which "Jane" 410 as person 415 contacted organization 320 ("law firm" 420 as organization 425 and "BBB" 430 as organization 435). A contacted 440 represents the contact between "Jane" 410 and "law firm" 420. A contacted 445 represents the contact between "Jane" 410 and "BBB" 430.

Figure 5:
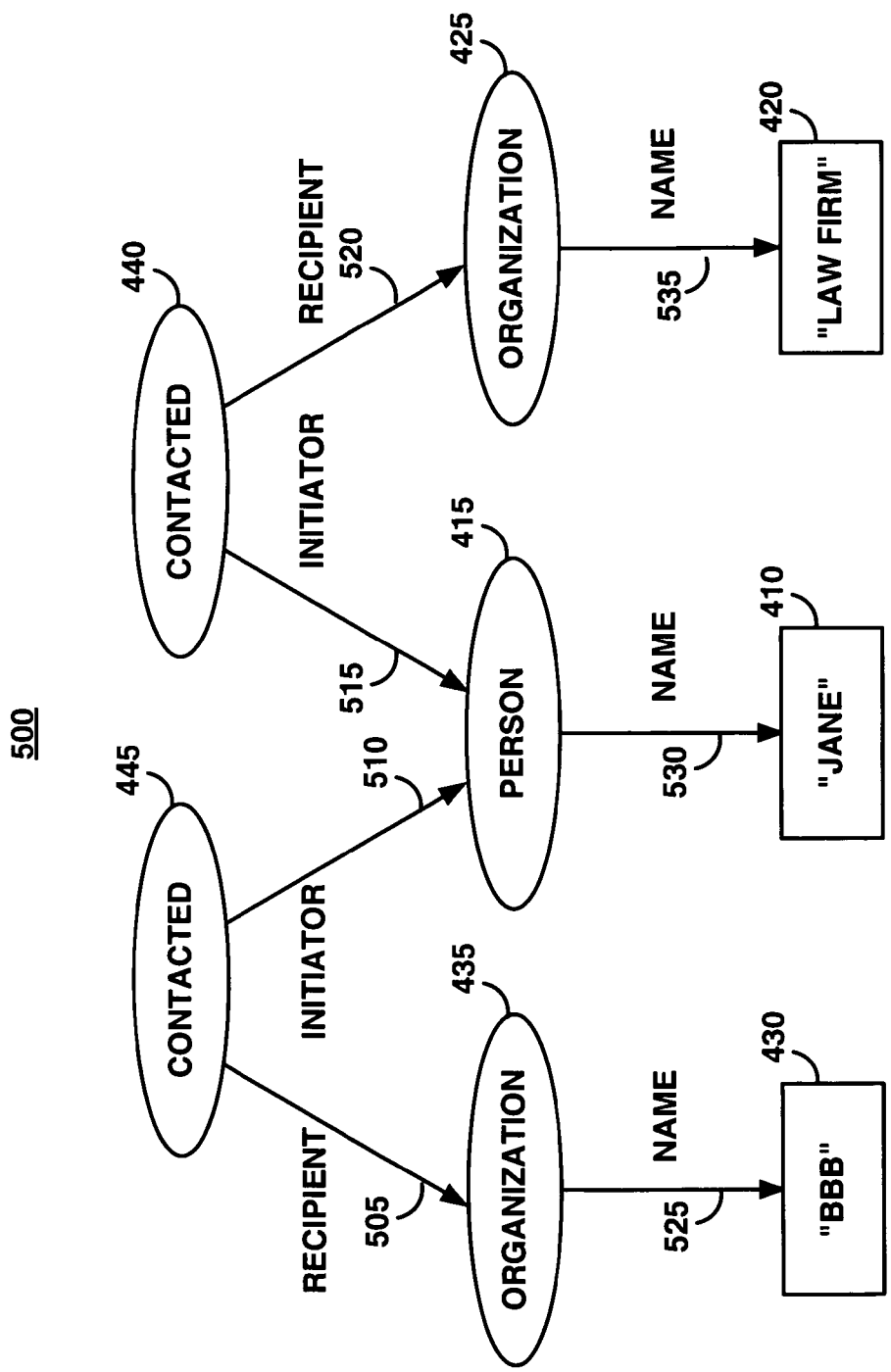
FIG. 5 is a diagram of an exemplary object graph generated for the annotations extracted from the text of FIG. 4.

FIG. 5 illustrates an object graph 500 generated from the annotations produced from text 405 shown in FIG. 4. Two different contacted objects share the object person 415; contacted 445 and contacted 440. An edge labeled as a recipient 505 represents a relationship between organization 435 and contacted 445. An edge labeled as an initiator 510 represents a relationship between person 415 and contacted 445. An edge labeled as an initiator 515 represents a relationship between person 415 and contacted 440. An edge labeled as a recipient 520 represents a relationship between organization 425 and contacted 440. An edge labeled as a name 525 represents a relationship between "BBB" 430 and organization 435. An edge labeled as a name 530 represents a relationship between "Jane" 410 and person 415. An edge labeled as a name 535 represents a relationship between "law firm" 420 and organization 425.

Figure 6:
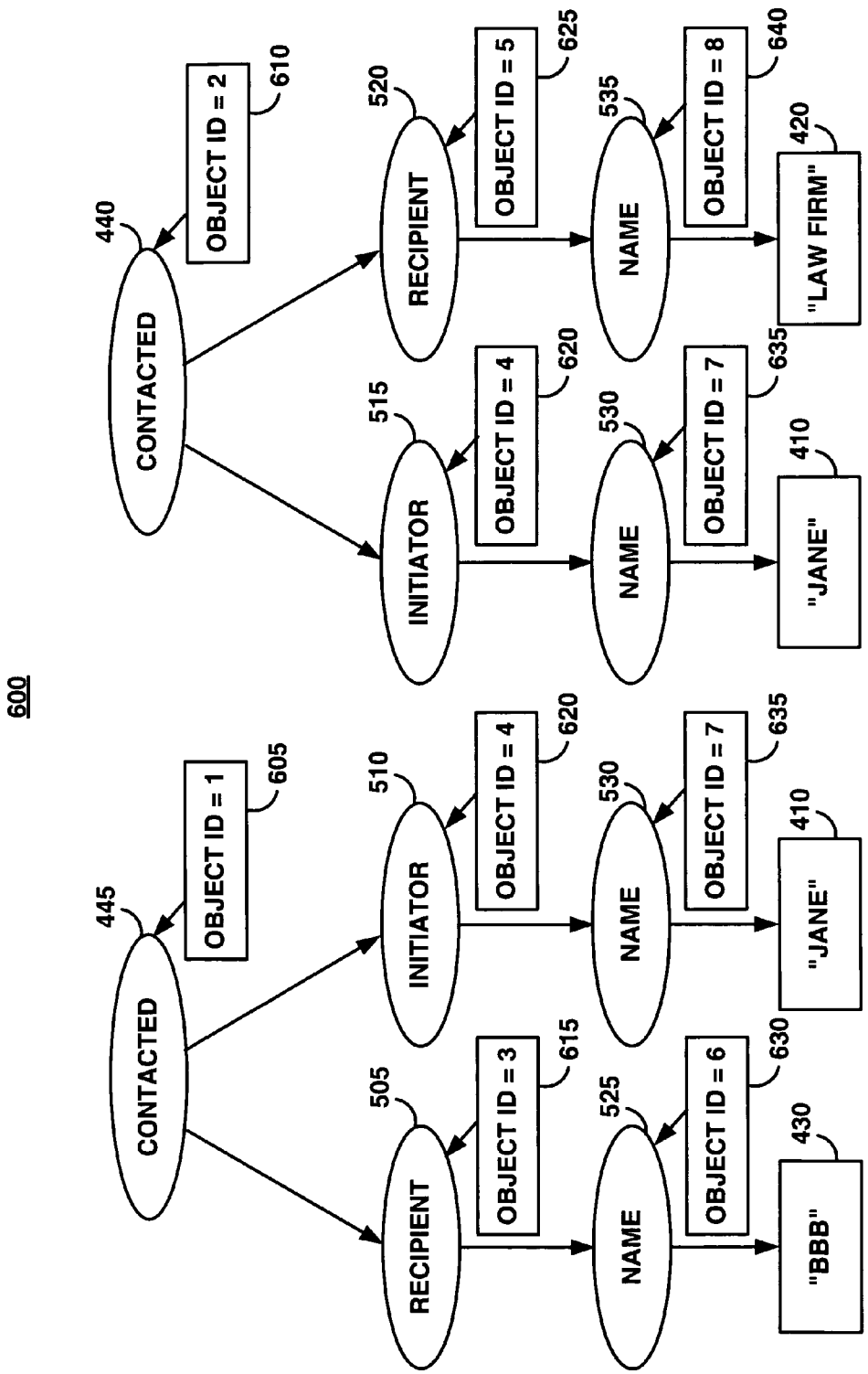
FIG. 6 is a diagram of exemplary XML data with object IDs generated from the object graph of FIG. 5 by the text annotation structured storage system of FIGS. 1 and 2.

FIG. 6 illustrates XML documents 600 (shown in a graphical format) generated by system 10 for the object graph 600. Edges such as recipient 505, initiator 510, initiator 515, and recipient 520 in the object graph 500 are converted to elements in the XML documents 600. System 10 maps the value of the person object 415 to one of the XML documents 600 once for each relationship in which the person object 415 participates.

System 10 retains original object identifiers of an object graph as a sub-element or attribute of each element. XML documents 600 illustrate exemplary object identifiers as an object ID 605, an object ID 610, an object ID 615, an object ID 620, an object ID 625, an object ID 630, an object ID 635, and an object ID 640.

A query generated by user 220 to ask the question "Which person contacted a "law firm" and the "BBB"?" translates into a join across two contacted XML elements, contacted 445 and contacted 440. The query is asking for occurrence of a single person object contacting two different organizations, a based on object-identity. The XML schema and documents generated by system 10 maintain the object identity by retaining an object identifier as a sub-element of each element.

Figure 7:
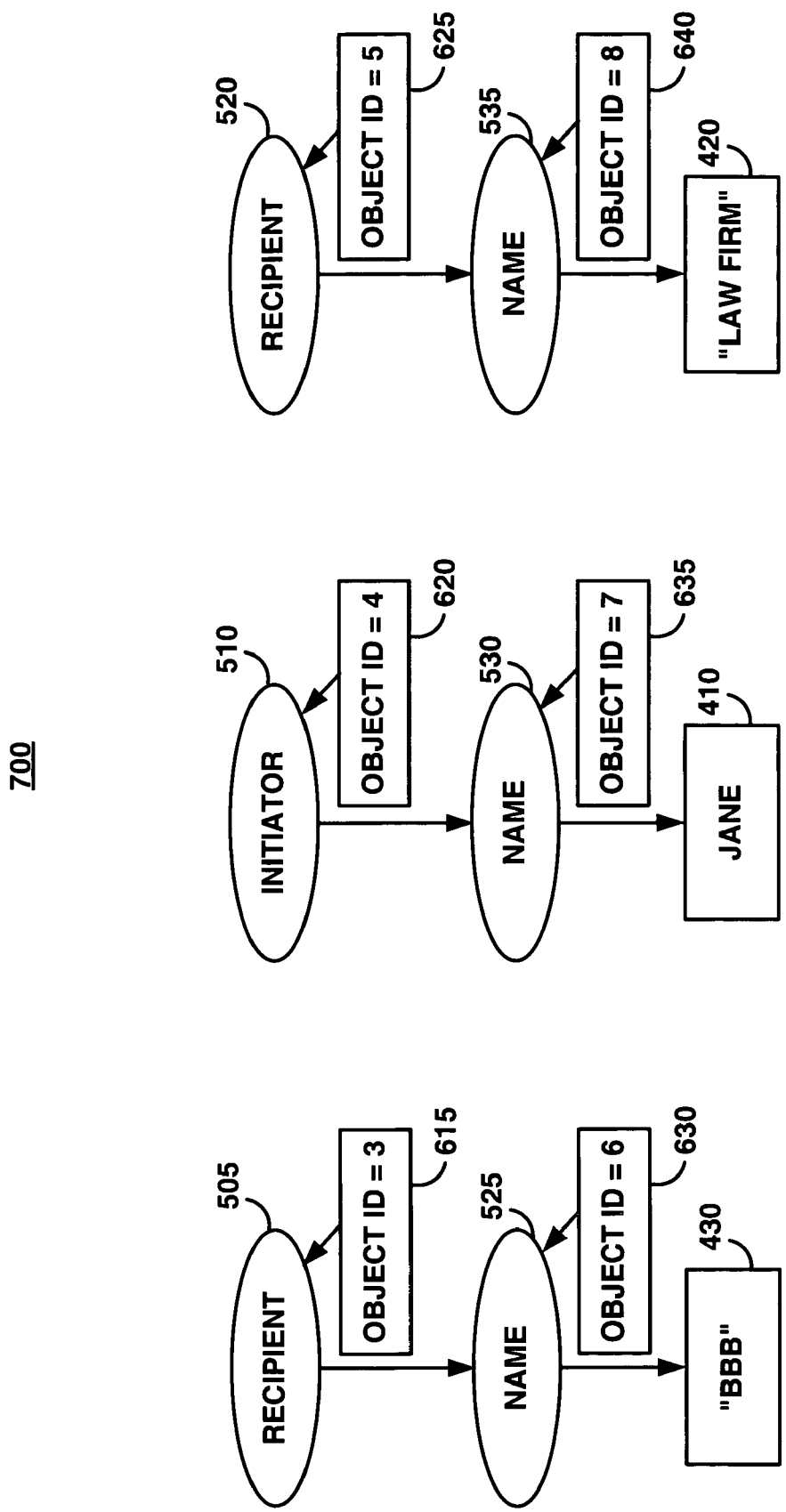
FIG. 7 is a diagram of exemplary XML data with object IDs generated from the subgraphs of FIG. 5 by the text annotation structured storage system of FIGS. 1 and 2.

The text analysis engines 45 may produce objects starting at any level in a type system. System 10 supports this behavior while storing annotation objects, as illustrated in FIG. 7. For example, there may be person or organization objects that do not participate in any relationship. System 10 stores these objects in the structured store 215 without any loss of information. System 10 generates an XML schema and XML documents for each subgraph in the object graph such as, for example, document 705 starting at recipient 505, document 710 starting at initiator 510, and document 715 starting at recipient 520.

System 10 supports independence of the structured data store 215 from the details of the order in which the annotators of the text analysis engines 45 are executed and when the corresponding objects are persisted. For example, consider the following scenarios. In one scenario (scenario A), the named-entity person text analysis engine, the named-entity organization text analysis engine, and the relationship contacted text analysis engine analyze a text dataset and the results are persisted to the structured data store 215. In another scenario (scenario B), a named-entity person text analysis engine and a named-entity organization text analysis engine analyze the dataset and the results are persisted to the structured data store 215. Then (sometime later) the object graph is recreated from the structured data store 215, the relationship contacted text analysis engine is executed, and the results are persisted.

The generated object graph is identical under both these scenarios. For scenario A, system 10 generates the XML documents 700 shown in FIG. 7. For scenario B, system 10 generates the XML documents 600 shown in FIG. 6 and the XML documents 700. Consequently, the XML documents generated by system 10 are independent of the order in which the text analysis engines 45 are executed.

Figure 8:
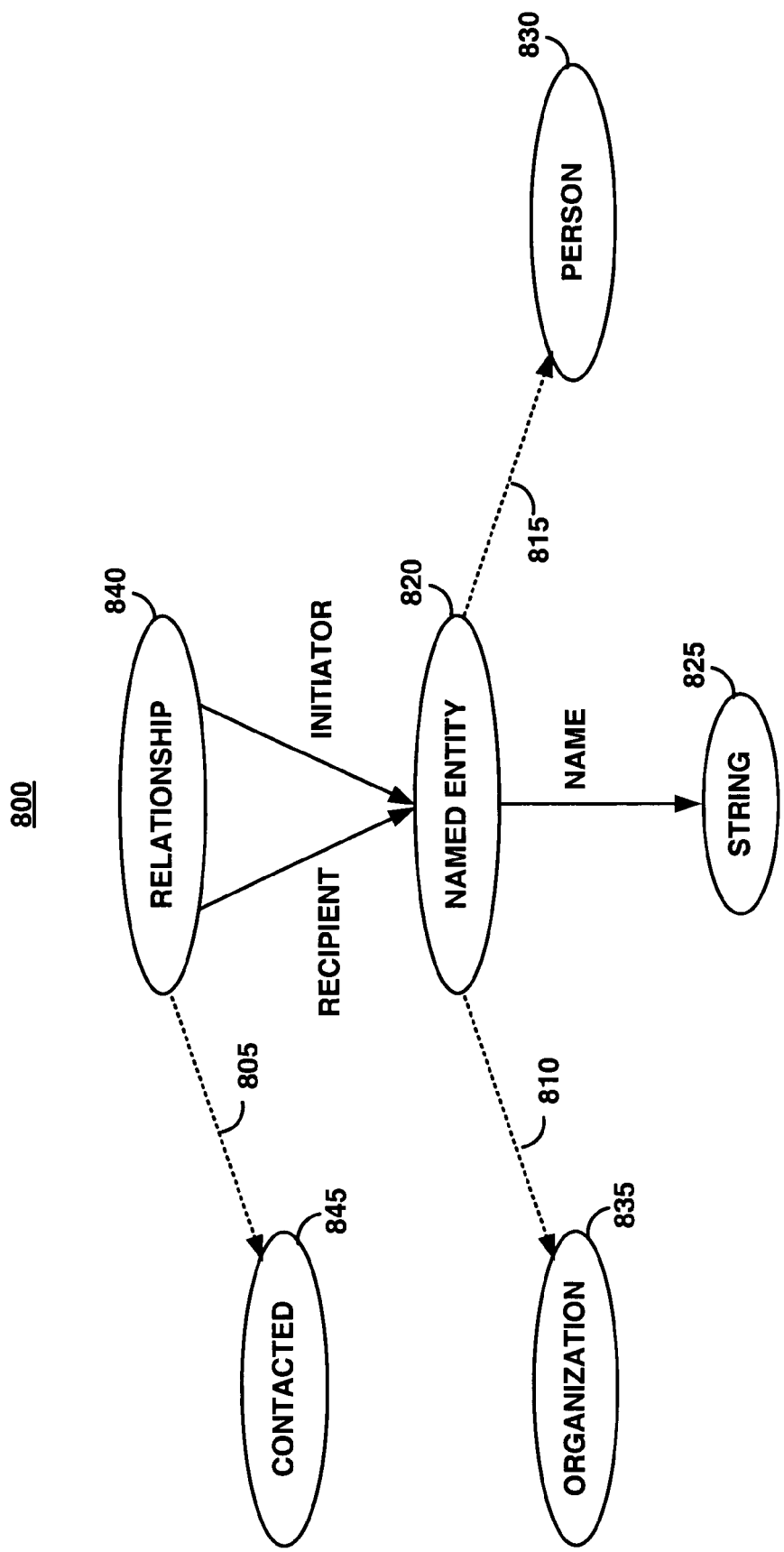
FIG. 8 is a diagram of an exemplary type system with inheritance that can be stored in structured format by the text annotation structured storage system of FIGS. 1 and 2.

System 10 supports inheritance, used by the type systems generated by text analytic engines 45. FIG. 8 illustrates an exemplary type system 800 using inheritance. Type system 800 is an alternative to the type system 305 of FIG. 3. The dotted lines 805, 810, 815 represent inheritance relationships across types.

Named entity 820 is a generic type that represents all named-entity objects; named entity 820 has a string attribute, denoted as string 825. Person 830 and organization 835 are subtypes of named entity 820. Similarly, relationship 840 is a generic type that describes instances in which one named entity 820 contacted another named entity 820. Contacted 845 is a sub-type of relationship 840. System 10 supports the ability to ask for all objects of a particular type (for example, named entity 820). In this case, the result set comprises all objects belonging to any subtype (person 830, organization 835, etc.) as well as the named entity 820. System 10 further supports the ability to restrict queries over objects belonging to a particular subtype; for example, retrieve relationship objects where a person contacted an organization.

System 10 supports the ability to query across annotations produced from the same text document. In a number of cases, queries over annotated text data are restricted within the context of original source documents. For example, the query "Which person contacted a "law firm" and the "BBB"?" is usually restricted to the original source document. Similarly, system 10 links the annotations data back to the original text document that produced the annotations. Consequently, system 10 enables querying across annotated text data and structured data.

Figure 9A:
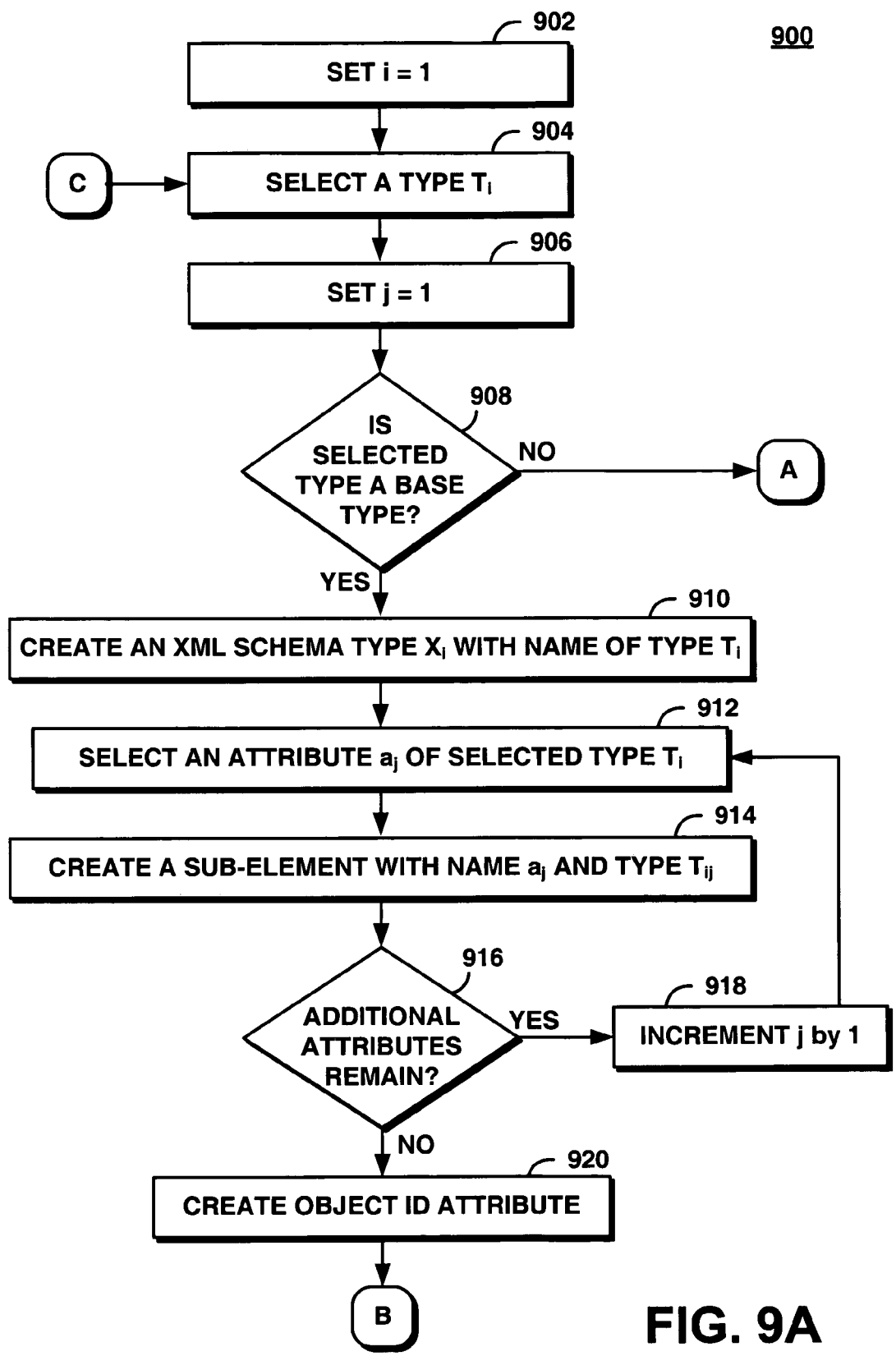
FIG. 9 is comprised of FIGS. 9A, 9B, and 9C and represents a process flow chart illustrating a method of operation of the text annotation structured storage system of FIGS. 1 and 2 in generating an XML schema from a type system.
Figure 9B:
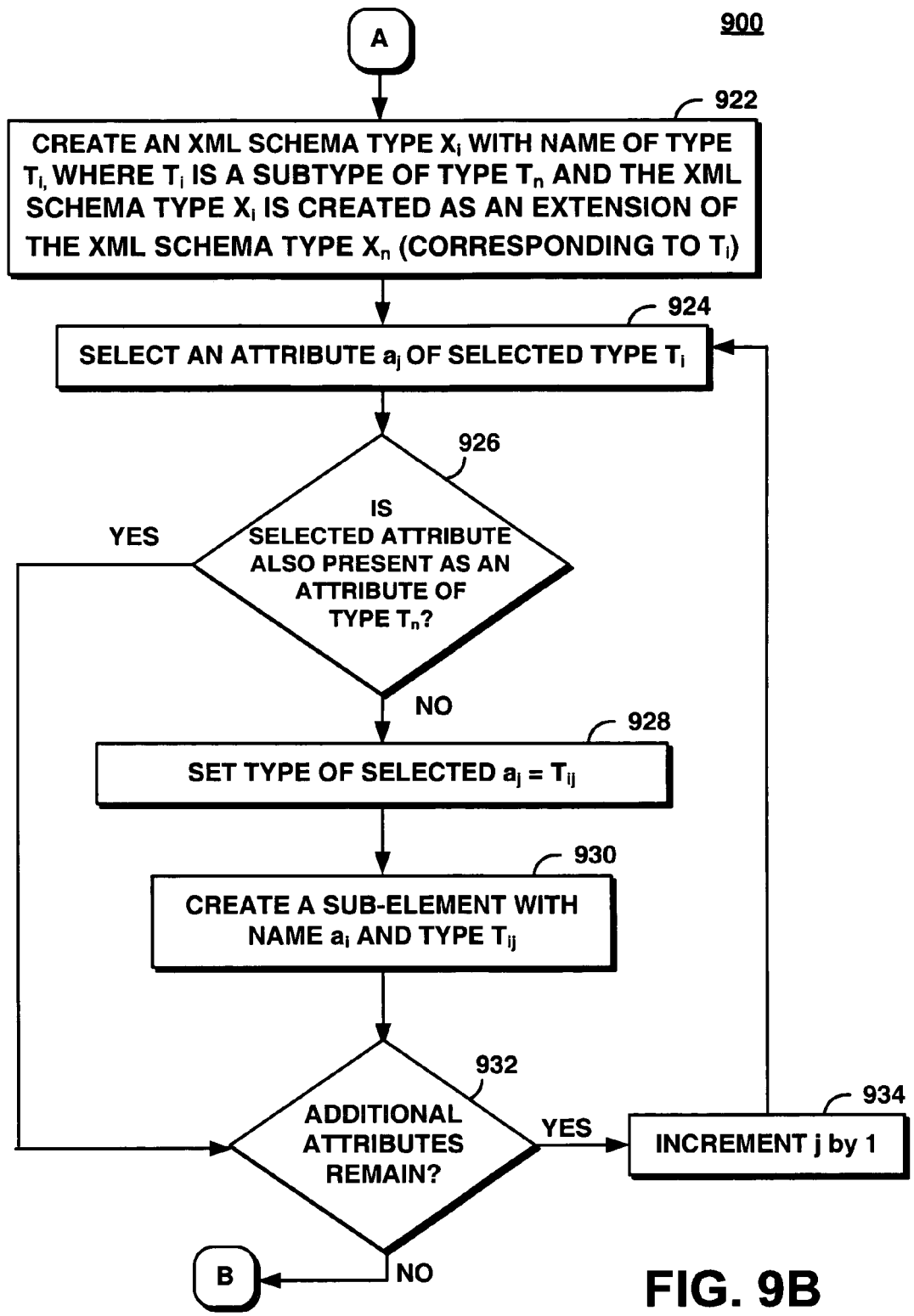
Figure 9C:
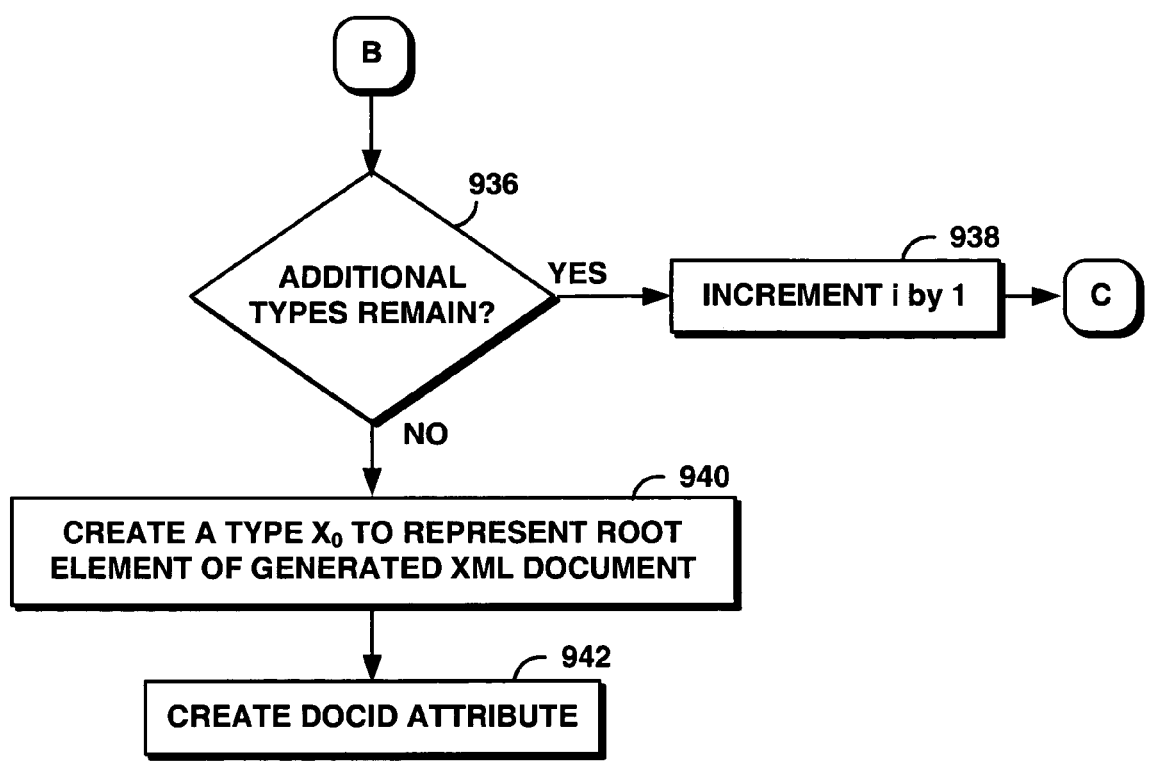

FIG. 9 (FIGS. 9A, 9B, 9C) illustrates a method 900 for generating an XML schema from an object type system as input, where $T_1, T_2, \ldots, T_k$ are k types defined in the object type system. The XML schema generator 205 sets an integer i=1 (step 902). The XML generator 205 selects a type $T_i$ in the object type system (step 904). The XML schema generator 205 sets an integer j=1 (step 906).

The XML schema generator 205 determines whether the selected type, $T_i$, is a base type (decision step 908). If yes, the XML schema generator creates an XML schema type $X_i$ with the name of the type $T_i$ (step 910). Let attributes$(T_i)=a_1, a_2, \ldots a_m$ be the attributes of type $T_i$. The XML schema generator 205 selects an attribute $a_j$ of the selected type $T_i$ (step 912). The XML schema generator 205 creates a sub-element with name $a_j$ and type $T_{ij}$ (step 914). The XML schema generator 205 determines if additional attributes remain for processing (decision step 916). If yes, the XML schema generator 205 increments j by 1 (step 918), returns to step 912, and repeats steps 912 through 918 until no additional attributes remain for processing. The XML schema generator 205 creates an object ID attribute (step 920) with type integer. Steps 912 through 920 generate a content model for type $T_i$ comprising a sequence of elements.

If the selected type is not a base type (decision step 920), the selected type is a subtype of type $T_n$. The XML schema generator 205 creates an XML schema type $X_i$ with the name of the type $T_i$ (step 922). This type is defined as an extension to type $X_n$, the type created corresponding to the object type $T_n$. Let attributes$(T_i)=a_1, a_2, \ldots a_m$ be the attributes of type $T_i$. The XML schema generator 205 selects an attribute $a_j$ of the selected type $T_i$ (step 924). If the selected attribute $a_j$ is not an attribute of type $T_n$ (decision step 926), the XML schema generator 205 sets type of $a_j$ to type $T_{ij}$ (step 928). The XML schema generator 205 creates a sub-element with name $a_j$ and type $T_{ij}$ (step 930). The XML schema generator 205 determines if additional attributes remain for processing (decision step 932). If yes, the XML schema generator 205 increments j by 1 (step 934), returns to step 924, and repeats steps 924 through 934 until no additional attributes remain for processing. If at decision step 926 the selected attribute $a_j$ is not an attribute of type $T_n$, the XML schema generator 205 proceeds to decision step 932. Steps 924 through 934 generate a content model for type $T_i$ comprising a sequence of elements.

The XML schema generator 205 determines whether additional types remain for processing (decision step 936). The XML schema generator 205 further proceeds to decision step 936 from step 920. If additional types, $T_i$, remain for processing, the XML schema generator 205 increments i by 1 (step 938) and returns to step 904, repeating steps 904 through 938 until no types, $T_i$, remain for processing. The XML schema generator 205 creates a type $X_0$ to represent a root element of the generated XML document (step 940). The content model of this element is $(e_1|e_2 \ldots |e_k)^*$, where the type of element $e_i$ is $X_i$ and the name of element $e_i$ is also $X_i$. The XML schema generator 205 creates a document ID (docid) attribute for the generated XML document (step 942).

An algorithm in psuedocode for method 900 of the XML schema generator 205 is as follows:
    Algorithm Construct_XMLSchema_From_AnnotationTypes(T)
    Let $T_1, T_2, \ldots T_k$ be the k types defined in the object type system.

For each type $T_i$,
    If $T_i$ is a base type,
        Let attrs$(T_i)=a_1, a_2, \ldots a_m$ be the attributes of type $T_i$.
        Create an XML schema type $X_i$ with the name of the type being $T_i$.
        The content model for type $T_i$ is a sequence of elements created as follows.
        For each attribute $a_j$ of type $T_i$,
            Let the type of $a_j$ be $T_{ij}$
            Create a sub-element with name $a_j$ and type $T_{ij}$
        Add an attribute called objectid with type integer.
    Otherwise, let $T_i$ be a subtype of type $T_n$.
        Let attrs$(T_i)=a_1, a_2, \ldots a_m$ be the attributes of type $T_i$.
        Create an XML schema type $X_i$ with the name of the type being $T_i$.
        This type is defined as an extension of type $X_n$, the type created corresponding to the object type $T_n$.
        The content model for type $T_i$ is a sequence of elements created as follows.
        For each attribute $a_j$ of type $T_i$, which is not an attribute of type $T_n$,
            Let the type of $a_j$ be $T_{ij}$
            Create a sub-element with name $a_j$ and type $T_{ij}$
    Create a type $X_0$ to represent the root element of the document.
    Created an attribute called docid with type integer.

Figure 10A:
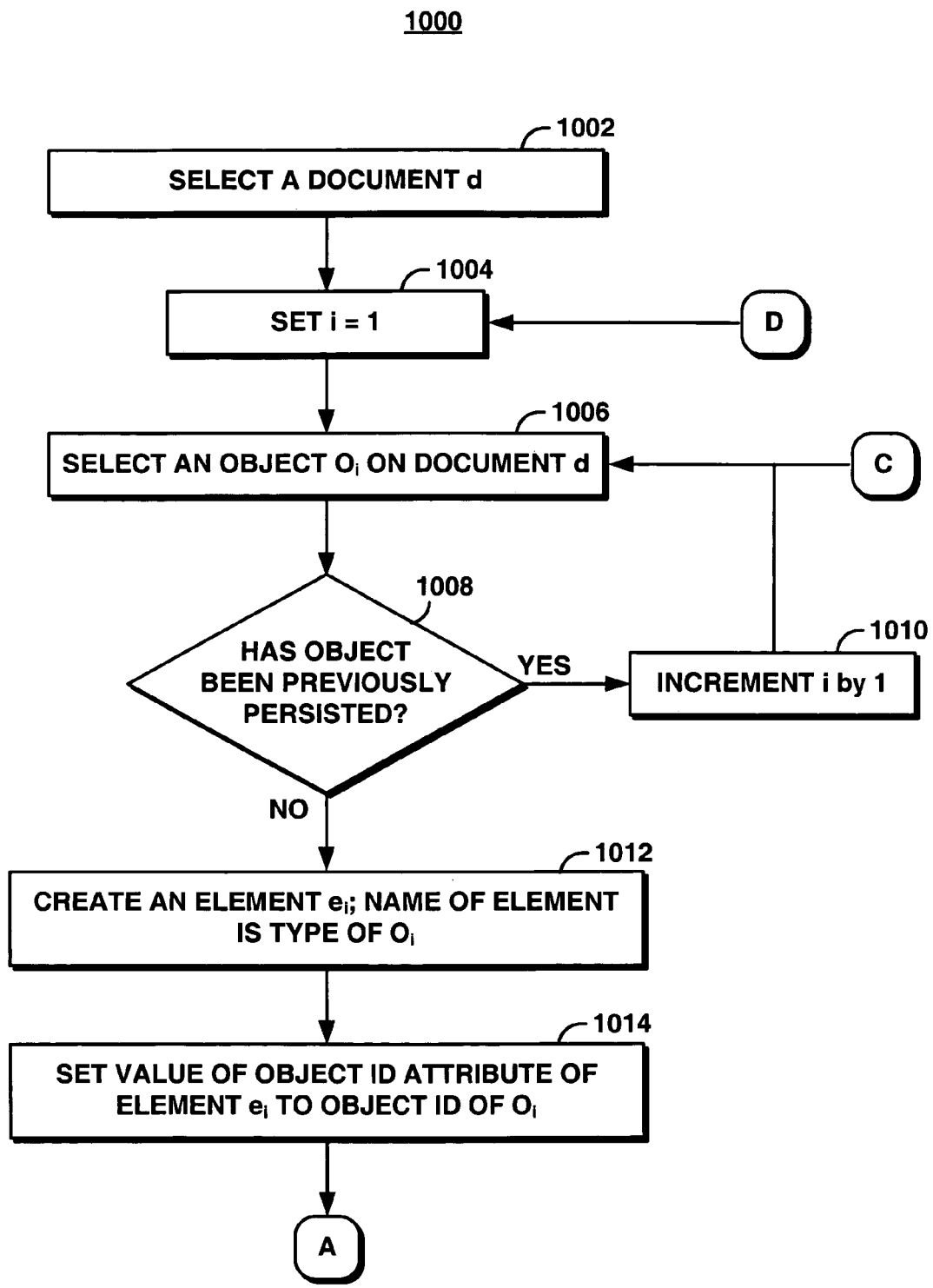
FIG. 10 is comprised of FIGS. 10A, 10B, and 10C and represents a process flow chart illustrating a method of operation of the text annotation structured storage system of FIGS. 1 and 2 in generating an XML document from an object graph.
Figure 10B:
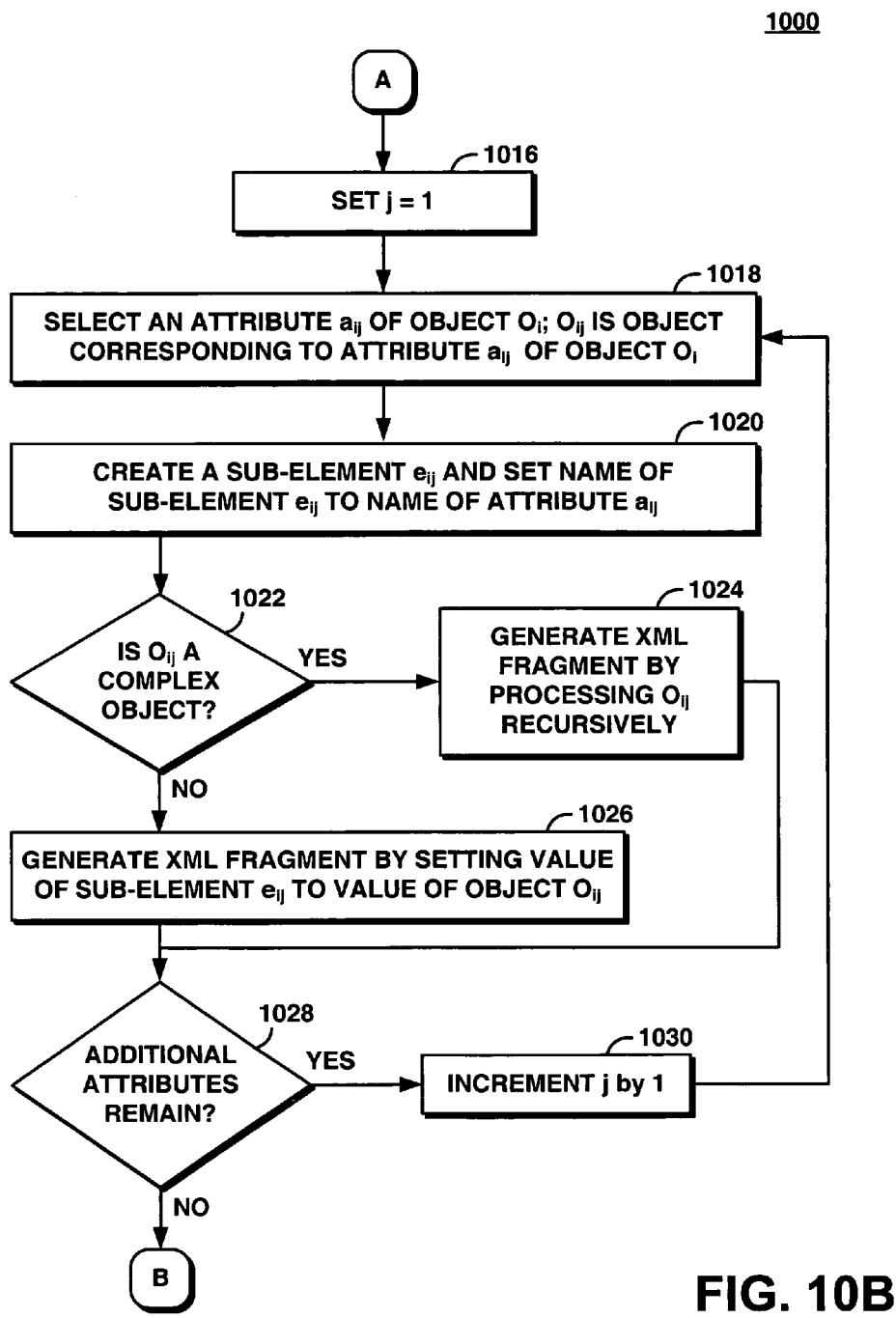
Figure 10C:
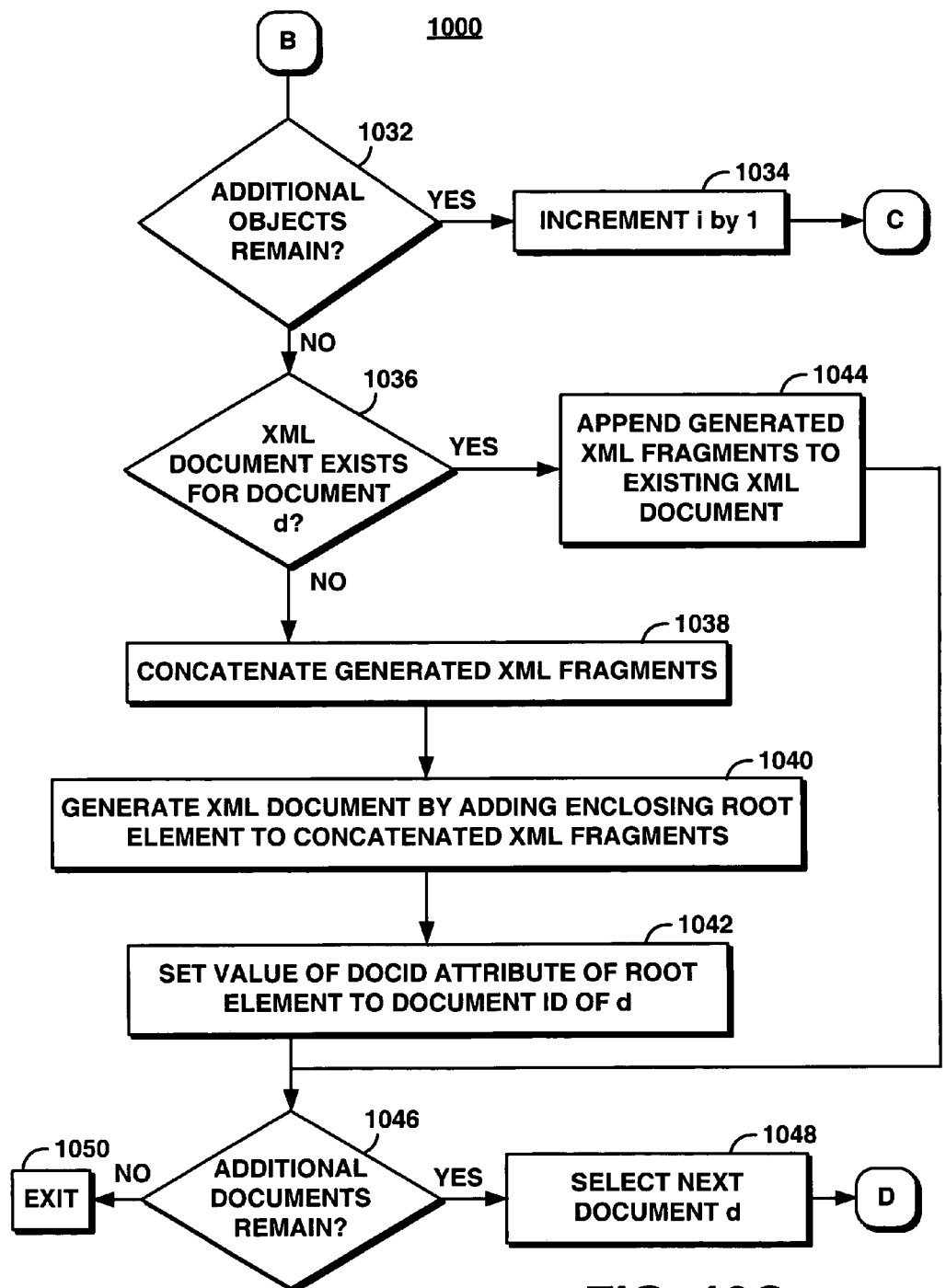

FIG. 10 (FIGS. 10A, 10B, 10C) illustrates a method 1000 of the XML document constructor 210 in generating an XML document from an object graph. The XML document constructor 210 selects a document d (step 1002). Let $O_1, O_2, \ldots, O_n$ be the objects in the object graph. Without loss of generality, all the objects are assumed to correspond to annotations on a single document d. Otherwise, system 10 partitions the objects based on the document ID and stores the objects on a per document basis.

The XML document constructor 210 sets an integer i=1 (step 1004). The XML document constructor 210 selects an object $O_i$ on document d (step 1006). The XML document constructor 210 determines whether the selected object $O_i$ has been previously persisted in the structured data repository 215 (step 1008). If yes, the XML document constructor 210 increments i by 1 (step 1010) and selects object $O_i$ on document d (step 1006). If the object $O_i$ has not been previously persisted (decision step 1008), the XML document constructor 210 creates an element $e_i$ (step 1012). The name of the created element $e_i$ is the type of the object $O_i$. The XML document constructor 210 sets the value of an object ID attribute of element $e_i$ to the object ID of $O_i$ (step 1014).

The XML document constructor 210 sets an integer j=1 (step 1016). The XML document constructor 210 selects an attribute $a_{ij}$ of object $O_i$ (step 1018). Object $O_{ij}$ is an object corresponding to the selected attribute $a_{ij}$ of object $O_i$. The XML document constructor 210 creates a sub-element $e_{ij}$ and sets the name of the sub-element $e_{ij}$ to the name of the attribute $a_{ij}$ (step 1020).

The XML document constructor 210 determines whether object $O_{ij}$ is a complex object (decision step 1022). If yes, the XML document constructor 210 generates an XML fragment by processing $O_{ij}$ recursively (step 1024). Otherwise, the XML document constructor 210 generates an XML fragment by setting the value of sub-element $e_{ij}$ to the value of object $O_{ij}$ (step 1026). The XML document constructor 210 determines whether additional attributes remain for processing (decision step 1028). If yes, the XML document constructor 210 increments j by 1 (step 1030) and repeats steps 1018 through 1030 until no additional attributes remain for processing.

The XML document constructor 210 determines whether additional objects remain for processing (decision step 1032). If yes, the XML document constructor 210 increments i by 1 (step 1034) and repeats steps 1006 through 1034 until no additional documents remain for processing. The XML document constructor 210 determines whether an XML document $X_d$ exists for the selected document d (decision step 1036). If no, the XML document constructor 210 concatenates generated XML fragments (step 1038). The XML document constructor 210 generates an XML document from the generated XML fragments by adding an enclosing root element (step 1040) to the concatenated XML fragments. The XML document constructor 210 sets the value of the document ID (docid) attribute of the root element to the document ID of d (step 1042).

If an XML document exists for document d (decision step 1036), the XML document constructor 210 appends the generated XML fragments to the existing XML document (step 1044). The XML document constructor 210 determines whether additional documents remain for processing (decision step 1046). If yes, the XML document constructor 210 selects a next document d (step 1048) and repeats steps 1004 through 1048 until all documents have been processed. Otherwise, the XML document constructor 210 exits processing (step 1050).

An algorithm in psuedocode for method 1000 of the XML document constructor 210 is as follows:

Algorithm Construct_XMLData_From_AnnotationObjects(O, T)

Let $O_1, O_2, \ldots, O_n$ be the objects in the object graph.

Without loss of generality, all the objects are assumed to correspond to annotations on a single document d. Otherwise, the objects are partitioned based on the document id and store them on a per document basis.

For each object $O_i$, check if the object has been previously persisted to the structured data store. If not, create an XML fragment as follows.

Create an element $e_i$. The name of this element is the type of object $O_i$.

Set the value of the objectid attribute of element $e_i$ to the object-id of $O_i$.

For each attribute $a_{ij}$ of object $O_i$

Create a sub-element $e_{ij}$. The name of this element is the name of the attribute $a_{ij}$.

Let $O_{ij}$ be the object corresponding to attribute $a_{ij}$ of object $O_i$.

If $O_{ij}$ is a complex object

Process this object recursively

Otherwise,

Set the value of the element $e_{ij}$ to the value of object $O_{ij}$.

If there is an XML document $X_d$ corresponding to the original text document d, Append all the XML fragments created in the previous step as sub-elements of the root element Otherwise, Create a new XML document by concatenating all the XML fragments creates in the previous step and adding an enclosing root element.

Set the value of the docid attribute of the root element to the document id of d.

The schema of the XML documents generated by system 10 captures the various features of the type system, such as complex types and inheritance. Querying based on any of the annotation types can be easily performed on the generated XML document. Since the hierarchical nature of the annotation object type system is reflected in the corresponding XML schema, path-based navigation queries starting with any of the annotation types is possible. Object-identity based querying is possible, using the object-id attribute.

Given an object graph, system 10 constructs the equivalent XML document in a fashion independent of the manner in which the object graph is created and when parts of the graph are persisted. This allows system 10 to persist annotation data with complete support for dynamism. In other words, if two object graphs are identical, then the corresponding XML documents are also identical, irrespective of how each of the object graphs were created.

Generating an XML document per original text document allows system 10 to efficiently support queries across annotations within a document. In addition, storing the XML documents in the structured data repository 215 enables seamless querying across the annotated text data and structured data.

Figure 11:
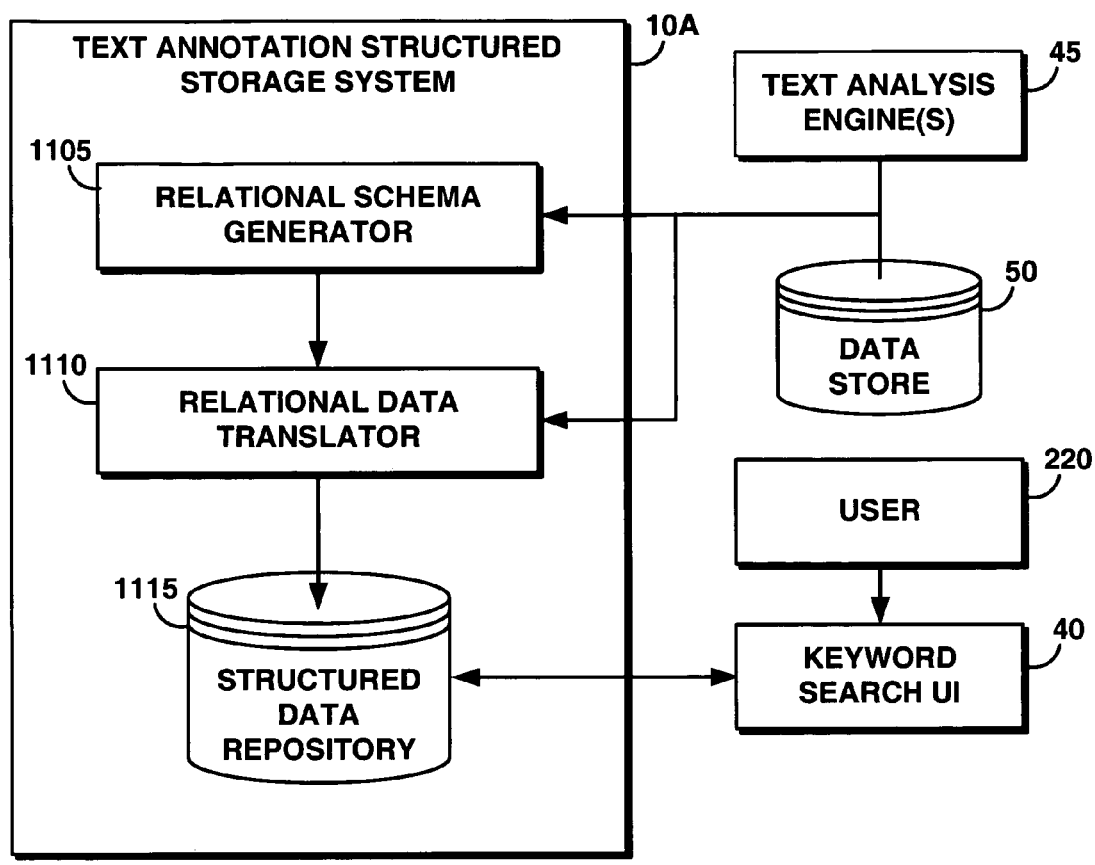
FIG. 11 is a block diagram of one embodiment of the high-level architecture of the text annotation structured storage system of FIG. 1 for generating relational schemas and relational data from a type system and an object graph.

FIG. 11 illustrates a high-level hierarchy of an embodiment of system 10A for storing text annotations with associated type information as one or more relational schemas with relational data comprising the text annotations. System 10A comprises a relational schema generator 1105, a relational data translator 1110, and a structured data repository 1115. Annotations generated by of the text analysis engines 45 and associated object graphs are stored in the data store 50. The relational schema generator 1105 maps an input object type system into one or more relational schemas. The relational data translator 1110 maps an object graph into a relational database comprising the relational data schemas. The structured data repository stores the output relational schemas and relational data in the structured data repository 1115. User 220 queries the relational data in the structured data repository 1115 via the keyword search user interface 30.

Figure 12A:
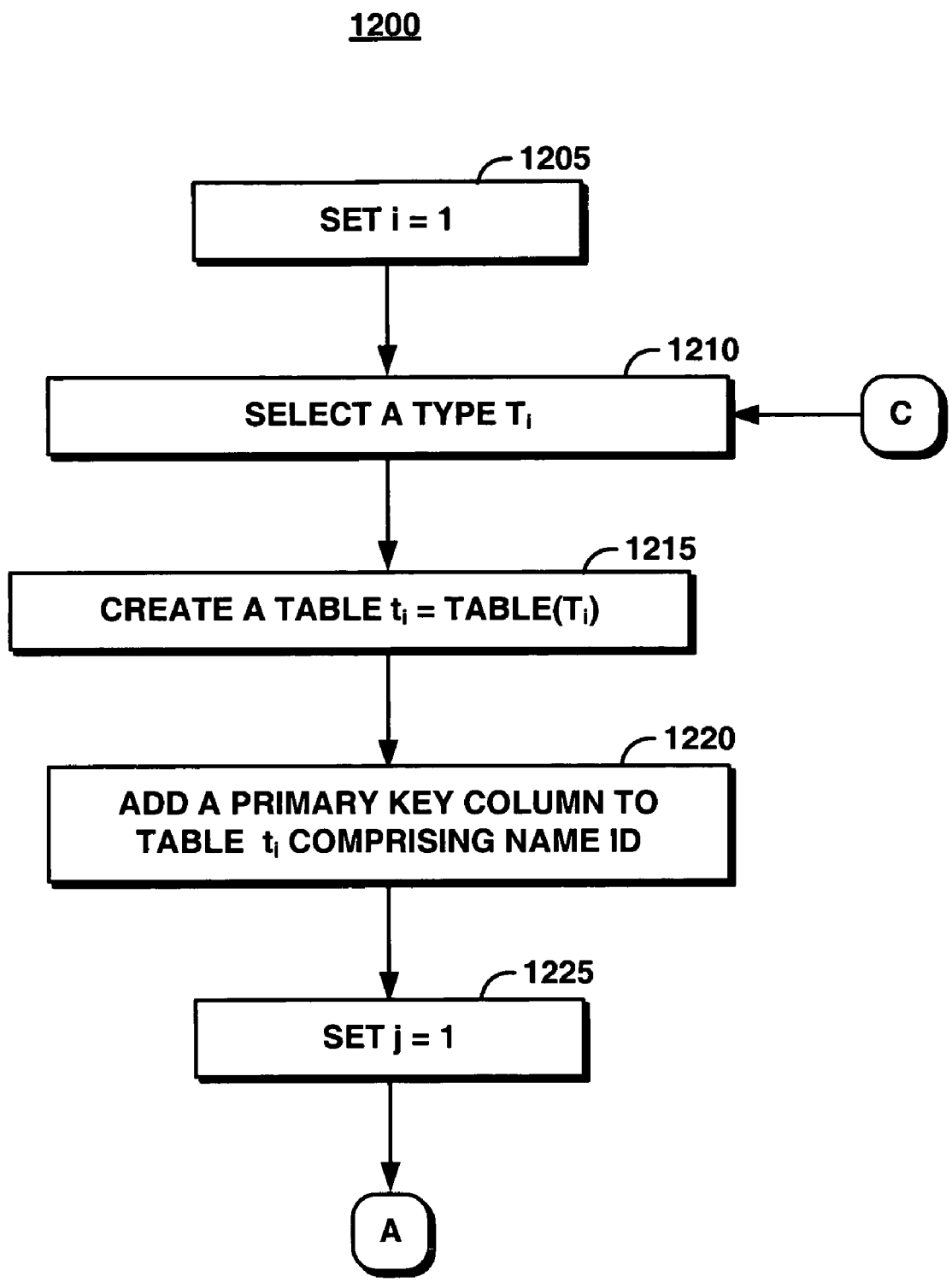
FIG. 12 is comprised of FIGS. 12A, 12B, and 12C and represents a process flow chart illustrating a method of operation of the text annotation structured storage system of FIGS. 1 and 2 in generating a relational schema.
Figure 12B:
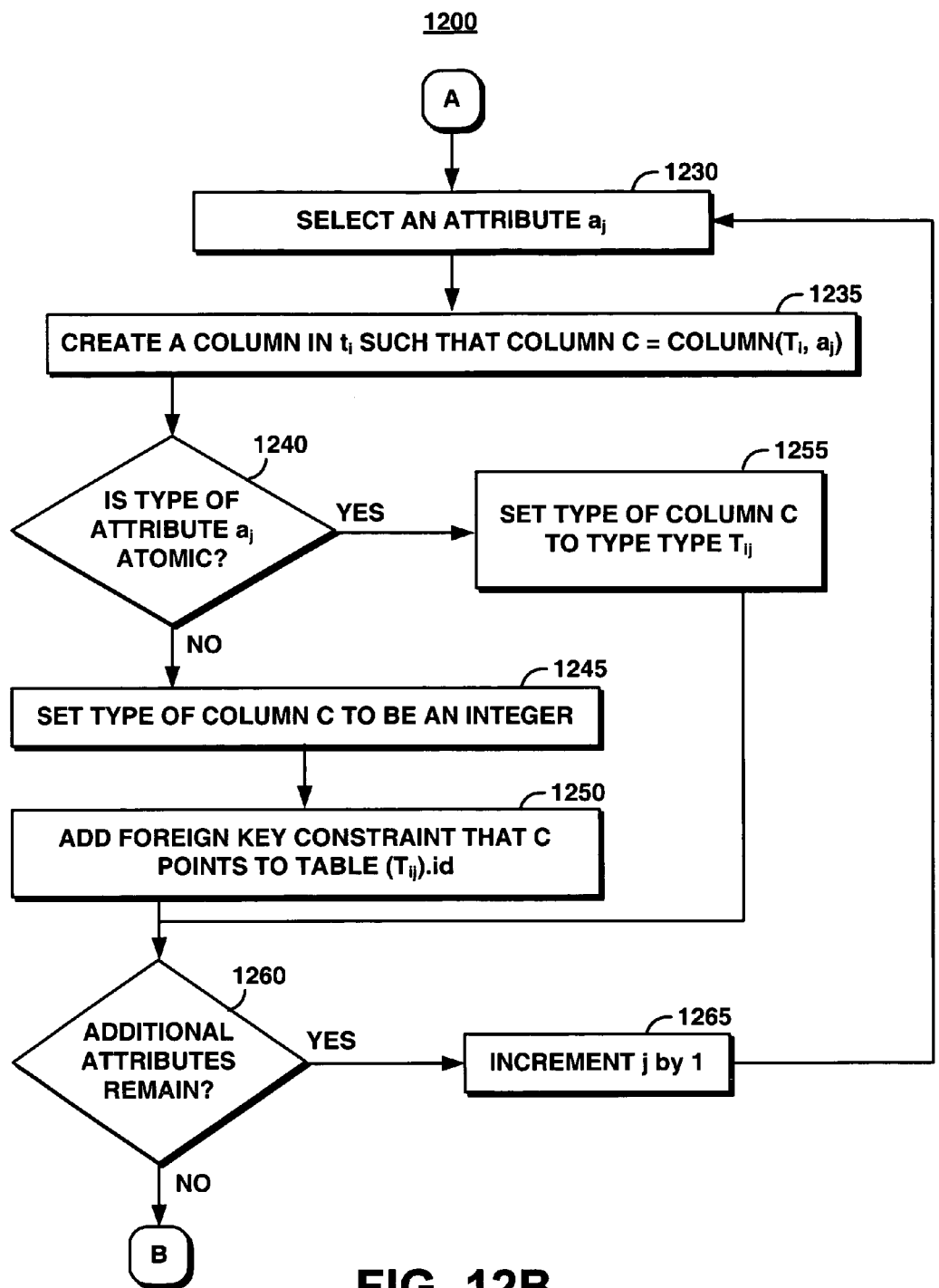
Figure 12C:
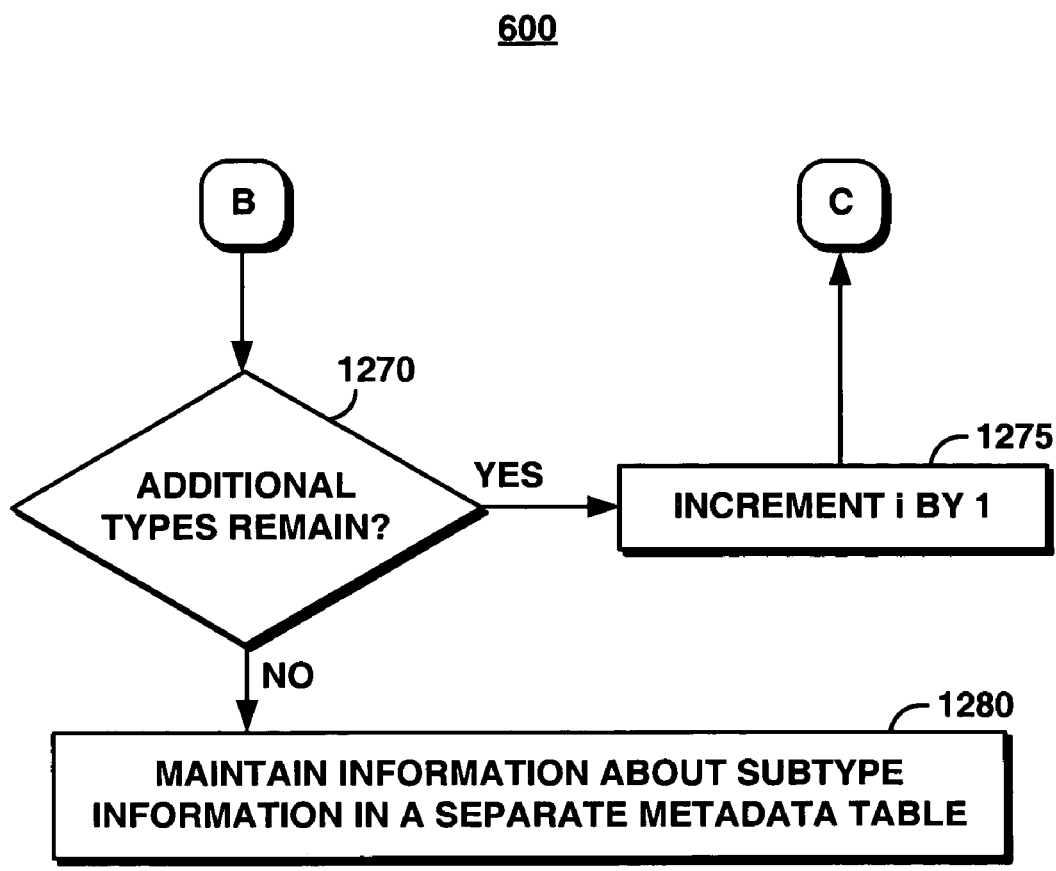

FIG. 12 (FIGS. 12A, 12B, 12C) illustrates a method 1200 for generating a relational schema from an object type system as input, where $T_1, T_2, \ldots, T_k$ are k types defined in the object type system. The relational schema generator 1105 sets an integer i=1 (step 1205). The relational schema generator 1105 selects a type $T_i$ (step 1210). The relational schema generator 1105 creates a table $t_i$=table ($T_i$) (step 1215). The relational schema generator 1105 adds a primary key column to table $t_i$ comprising name ID as the primary key (step 1220). The relational schema generator 1105 sets an integer j=1 (step 1225).

Let attributes($T_i$)=$a_1, a_2, \ldots a_m$ be the attributes of type $T_i$. The relational schema generator 1105 selects an attribute $a_j$ (step 1230). The relational schema generator 1105 creates a column in table $t_i$ such that column C=column ($T_i$, $a_j$) (step 1235). The relational schema generator 1105 determines whether the type of attribute $a_j$ is atomic (decision step 1240). If no, the relational schema generator 1105 sets the type of column C to be integer (step 1245). The relational schema generator 1105 adds a foreign key constraint that column C points to table ($T_{ij}$).id (step 1250). If the type of attribute aj is atomic (decision step 1240), the relational schema generator 1105 sets the type of column C to the type $T_{ij}$ (step 1255).

The relational schema generator 1105 determines whether additional attributes remain for processing (decision step 1260). If yes, the relational schema generator 1105 increments j by 1 (step 1265) and repeats steps 1230 through 1265 until no additional attributes remain for processing. The relational schema generator 1105 determines whether additional types remain for processing (decision step 1270). If yes, the relational schema generator 1105 increments i by 1 (step 1275) and repeats steps 1210 through 1275 until no additional types remain for processing. The relational schema generator 1105 maintains information about the subtype information in a separate metadata table (step 1280). The separate metadata table stores information about all the types present and corresponding attributes.

An algorithm in psuedocode for method 1200 of the relational schema generator 1105 is as follows:

Algorithm Construct_RelationalSchema_From_AnnotationTypes(T)
Let $T_1, T_2, \ldots T_k$ be the k types defined in the object type system.
For each type $T_i$,
   Create a table $t_i$=table($T_i$).
   Add a column with name id to act as the primary key.
   Let attrs($T_i$)=$a_1, a_2, \ldots a_m$ be the attributes of type $T_i$.
   For each attribute $a_j$,
     Create a column C=column($T_i$, $a_j$).
     If the type of attribute $a_j$ (say $T_{ij}$) is atomic,
        Set the type of the column C to the type $T_{ij}$.
     Otherwise,
        Set the type of the column C to be integer.
        Add a foreign key constraint that C points to table ($T_{ij}$).id
Maintain information about the subtype information in a separate metadata table. This table also stores information about all the types present and their corresponding attributes.

Figure 13A:
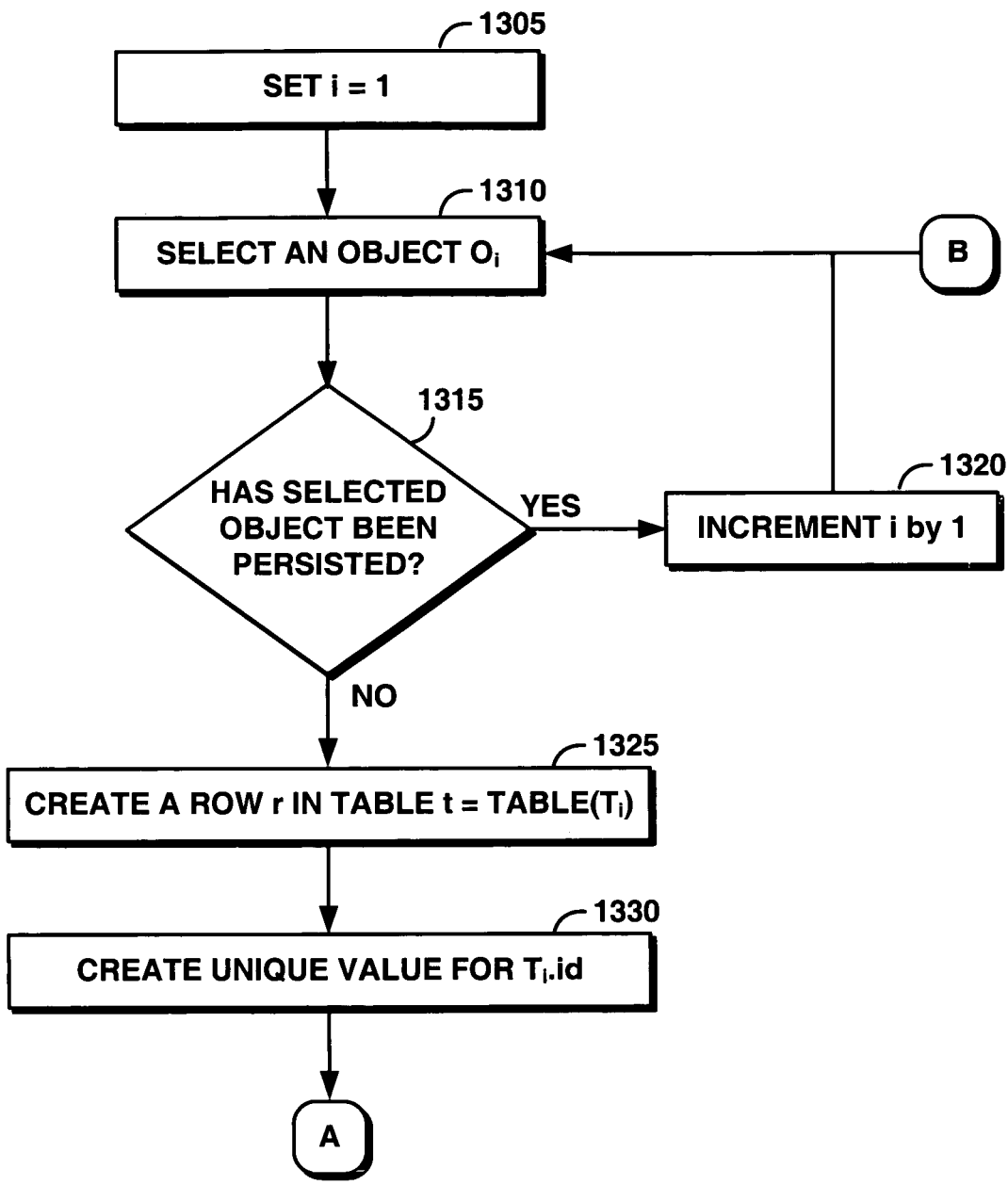
FIG. 13 is comprised of FIGS. 13A and 13B and represents a process flow chart illustrating a method of operation of the text annotation structured storage system of FIGS. 1 and 2 in generating a set of relational data.
Figure 13B:
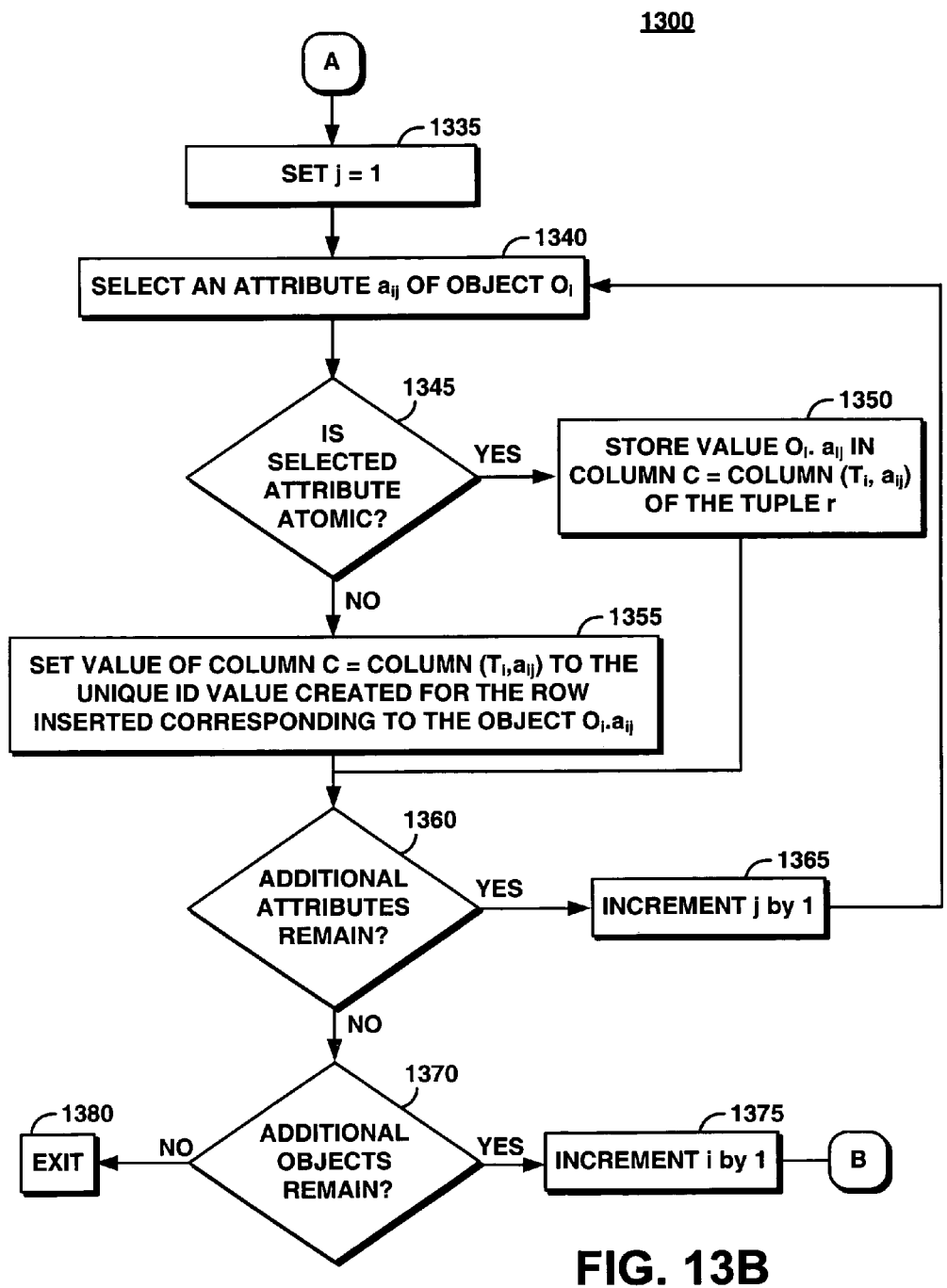

FIG. 13 (FIGS. 13A, 13B) illustrates a method 1300 of the relational data translator 1110 in generating relational data from an object graph. Let $O_1, O_2, \ldots, O_n$ be the objects in the object graph. The relational data translator 1110 sets an integer i=1 (step 1305). The relational data translator 1110 selects an object $O_i$ (step 1310). The relational data translator 1110 determines whether the selected object $O_i$ has been previously persisted in the structured data repository 1115 (step 1315). If yes, the relational data translator 1110 increments i by 1 (step 1320) and selects object $O_i$ (step 1310).

If the object $O_i$ has not been previously persisted (decision step 1315), the relational data translator 1110 creates a row r in table t=table($T_i$) (step 1325). The relational data translator 1110 creates a unique value for $T_i$.id (step 1330). The relational data translator 1110 sets an integer j=1 (step 1335). The relational data translator 1110 selects an attribute $a_{ij}$ of object $O_i$ (step 1340). The relational data translator 1110 determines whether the selected attribute is atomic (decision step 1345). If yes, the relational data translator 1110 stores a value $O_i.a_{ij}$ in column C=column ($T_i$, $a_{ij}$) of the tuple r (step 1350). Otherwise, the relational data translator 1110 sets the value of column C=column ($T_i$, $a_{ij}$) to the unique ID value created for the row inserted corresponding to the object $O_i.a_{ij}$ (step 1355).

The relational data translator 1110 determines whether additional attributes remain for processing (step 1360). If yes, the relational data translator 1110 increments j by 1 and repeats steps 1340 through 1365 until no additional attributes remain for processing. The relational data translator 1110 determines whether additional objects remain for processing (decision step 1370). If yes, the relational data translator 1110 increments i by 1 and repeats steps 1310 through 1375 until no additional objects remain for processing. When all objects have been processed, the relational data translator 1110 exits (step 1380).

An algorithm in psuedocode for method 1300 of the relational data translator 1100 is as follows:

Algorithm Construct_RelationalData_From_ AnnotationObjects(O, T)
Let $O_1, O_2, \ldots, O_n$ be the objects in the object graph.
For each object $O_i$ of type $T_i$, which has not been persisted previously to the structured data store,
   Create a row r in the table t=table($T_i$). A unique value for $T_i$.id is created.
   For each attribute $a_{ij}$ of object $O_i$
     If $a_{ij}$ is an atomic attribute,
        The value $O_i.a_{ij}$ is stored in the column C=column ($T_i$, $a_{ij}$) of the tuple r.
     Otherwise,
        The value of the column C=column($T_i$, $a_{ij}$) is set to the unique id value created for the row inserted corresponding to the object $O_i.a_{ij}$.

System 10A supports querying based on types. Supporting path-based navigation queries by system 10A requires specifying joins across relations. The relational schema captures part of the annotation type system. The hierarchical nature of the type system is captured by the integrity constraints on the relational schema. The rest of the information, such as inheritance, is stored in the metadata table. System 10A enables object-identity based querying using value-based predicates on the object-id attributes. System 10A supports for dynamism, in terms of both running new text analysis engines 45 on existing data and also running text analysis engines 45 on new data. The relational data stored for an object graph is independent of the order in which text analysis engines 45 were executed and when intermediate object graphs were persisted. In addition, storing the XML documents in the structured data repository 1115 enables seamless querying across the annotated text data and structured data.

It is to be understood that the specific embodiments of the invention that have been described are merely illustrative of certain applications of the principle of the present invention. Numerous modifications may be made to the system and method for storing text annotations with associated type information in a structured data store described herein without departing from the spirit and scope of the present invention.

What is claimed is:

1. A method of storing annotations with associated type information in a structured data store, comprising:
generating an object type system; said object type system comprising at least two name objects and at least one action object;
generating the annotations and associated object graphs;
indicating relationships between annotations; each of said relationships responsive to an action, an initiator of said action and a recipient of said action;
mapping an input object type system into a queryable structured data format;
mapping input data from input objects in the input object type system to the queryable structured data format;
retaining an identifier for each input object as a sub-element or an attribute of an element of said queryable structured data format; wherein the queryable structured data format and associated data persist in a structured data repository; wherein identity of said input objects is preserved in said structured data repository; and
wherein the queryable structured data format comprises an XML schema;
wherein said mapping said input object type system comprises the steps of:
selecting a type from said input object type system;
determining if said type is a base type; and
if said type is a base type, then creating an XML schema with name of said type; and
if said type is not a base type, then creating an XML schema with name of said type, said XML schema is a subtype of another XML schema.

2. The method of claim 1, further comprising storing the annotations and associated object graphs in a database.

3. The method of claim 2, wherein the database comprises a relational database.

4. The method of claim 1, wherein the input data comprises a text document; said names include a person's name and an organization's name and said action is said person contacting said organization.

* * * * *